A. HANSON.
WHEEL.
APPLICATION FILED MAY 13, 1907. RENEWED AUG. 29, 1908.

916,929.

Patented Mar. 30, 1909.

Witnesses
Phil E. Barnes.
J. J. Sheehy Jr.

Inventor
Andrew Hanson.
By James J. Sheehy
Attorney

UNITED STATES PATENT OFFICE.

ANDREW HANSON, OF ALPENA, MICHIGAN.

WHEEL.

No. 916,929.     Specification of Letters Patent.     Patented March 30, 1909.

Application filed May 13, 1907, Serial No. 373,484. Renewed August 29, 1908. Serial No. 450,794.

*To all whom it may concern:*

Be it known that I, ANDREW HANSON, citizen of the United States, residing at Alpena, in the county of Alpena and State of Michigan, have invented new and useful Improvements in Wheels, of which the following is a specification.

My invention pertains to wheels of the spring type; and it contemplates the provision of a wheel embodying a strong and durable construction whereby the different parts of the wheel are relieved of strain during travel of the wheel over rough roads, and the transmission of shock and jar to the axle bearing the wheel is precluded.

Figure 1:
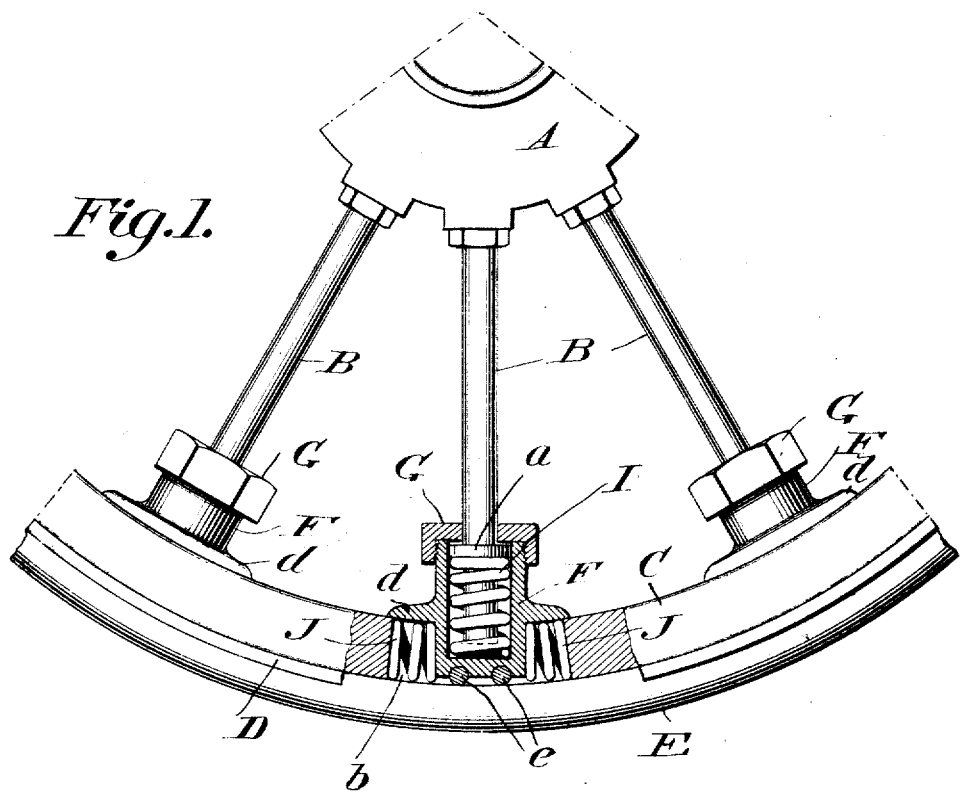
Figure 2:
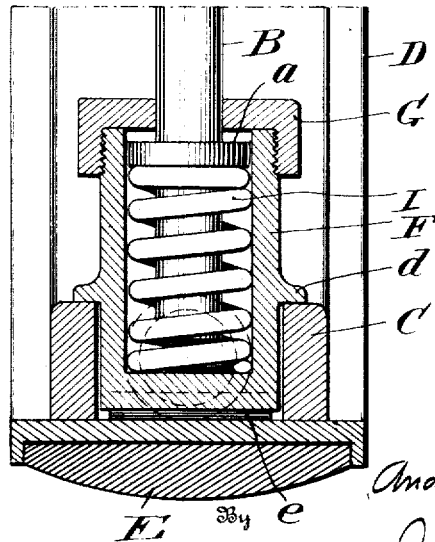

The invention will be fully understood from the following description and claims when the same are read in connection with the accompanying drawings, forming part of this specification, in which:

Figure 1 is a view partly in side elevation and partly in vertical section of so much of a wheel as is necessary to illustrate the preferred embodiment of my invention. Fig. 2 is an enlarged, detail section taken at a right angle to Fig. 1 and illustrating the manner in which the spokes of the wheel are connected with the felly thereof.

Similar letters designate corresponding parts in all of the views of the drawings, referring to which:

A is the hub of my novel wheel, which is made of suitable metal, and B B are the spokes which are also of suitable metal. The said spokes are provided at a slight distance from their outer ends with integral collars *a*, and are adjustably connected with the hub A so as to permit of the spokes being moved relative to the hub in order to increase or diminish the tension of the spoke-engaging springs presently described.

C is the felly of the wheel which like the hub A and spokes B is of suitable metal and is provided at intervals of its length with radially disposed openings *b*.

D is a rim, preferably of steel, surrounding the felly.

E is a cushion tire, preferably of solid rubber, arranged on and carried by the rim D, and F F are metallic sockets positioned in the felly openings *b* and receiving the outer end portions and the collars *a* of the spokes B and having their inner ends exteriorly threaded, as shown, for the engagement of metallic cap nuts G which loosely receive those portions of the spokes at the inner sides of the collars *a*. The sockets F are flanged, as indicated by *d*, so as to bear against the inner side of the felly C, and are provided in their outer ends with semi-circular grooves to receive anti-friction rollers *e* which are designed by bearing against the inner side of the rim D to reduce to a minimum the friction incident to movement of the sockets in the direction of the circumference of the wheel.

I I are coiled springs contained in the sockets F and surrounding the outer portions of the spokes B and interposed between the outer ends of the sockets and the collars *a* on the spokes. These springs I are preferably of steel, and their office is to permit of movement within certain limitations of the felly and rim inward on the spokes and to contribute to relieving the parts of the wheel of strain and to prevent the transmission of shock and jar to the axle bearing the wheel during the travel of the wheel over rough roads.

J J are coiled springs, also preferably of steel, of which two are employed in each opening *b* and in combination with each socket F. These springs J are interposed between opposite sides of the sockets F and the opposite end walls of the openings *b*, and are designed to cushion the sockets when the same tend to move in the direction of the wheel's circumference and in that way assist in preventing the imposition of strain on the several parts of the wheel.

It will be gathered from the foregoing that my novel wheel notwithstanding its springiness, is simple and compact in construction and is well adapted to withstand the rough usage to which vehicle wheels are ordinarily subjected.

The construction herein shown and described constitutes the preferred embodiment of my invention, but it is obvious that in practice such changes in the form, construction, and relative arrangement of parts may be made as fairly fall within the scope of my invention as claimed.

Having described my invention, what I claim and desire to secure by Letters-Patent, is:

1. In a wheel, the combination of a felly having a series of radially disposed openings, spokes, spoke sockets receiving the outer portions of the spokes and arranged and movable laterally in the openings of the felly, and closed at their outer ends and having exterior flanges bearing and movable against the inner side of the felly, springs contained in the sockets and interposed between the outer closed ends thereof and the spokes, and springs retained in the felly openings at opposite sides of the spoke sockets by the flanges on said sockets and interposed between opposite sides of the sockets and the opposed walls of the openings in the felly.

2. In a wheel, the combination of a felly having a series of radially-disposed openings, a rim surrounding the felly, spokes having enlargements adjacent to their outer ends, spoke sockets receiving the outer portions of the spokes and arranged in the openings of the felly, springs contained in the sockets and interposed between the outer portions thereof and the enlargements on the spokes, springs arranged in the felly openings at opposite sides of the spoke sockets, and anti-friction devices interposed between the spoke sockets and the rim.

In testimony whereof I have hereunto set my hand in presence of two subscribing witnesses.

ANDREW HANSON.

Witnesses:
JOSEPH H. COBB,
MARGARET McDONALD.